Patented Nov. 14, 1939

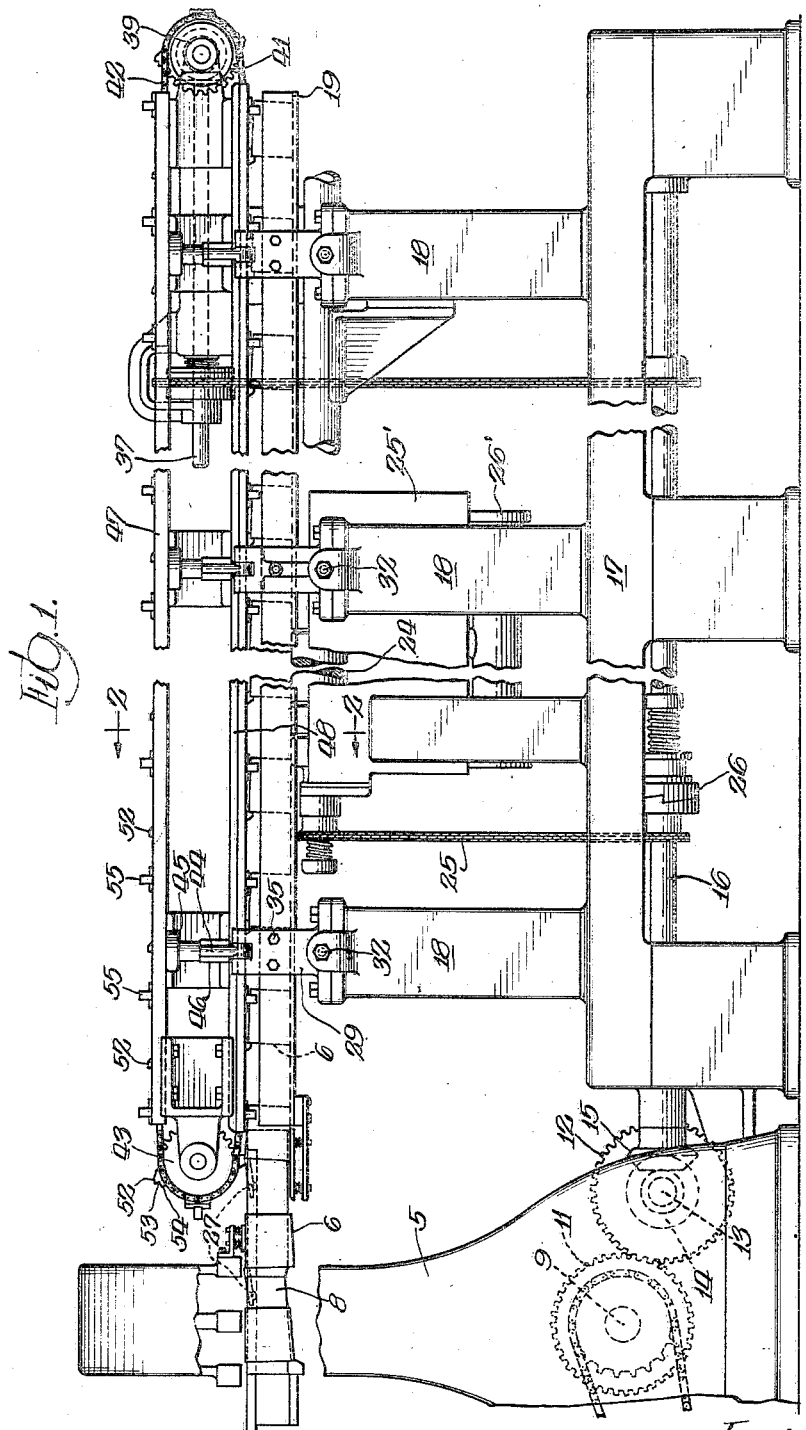

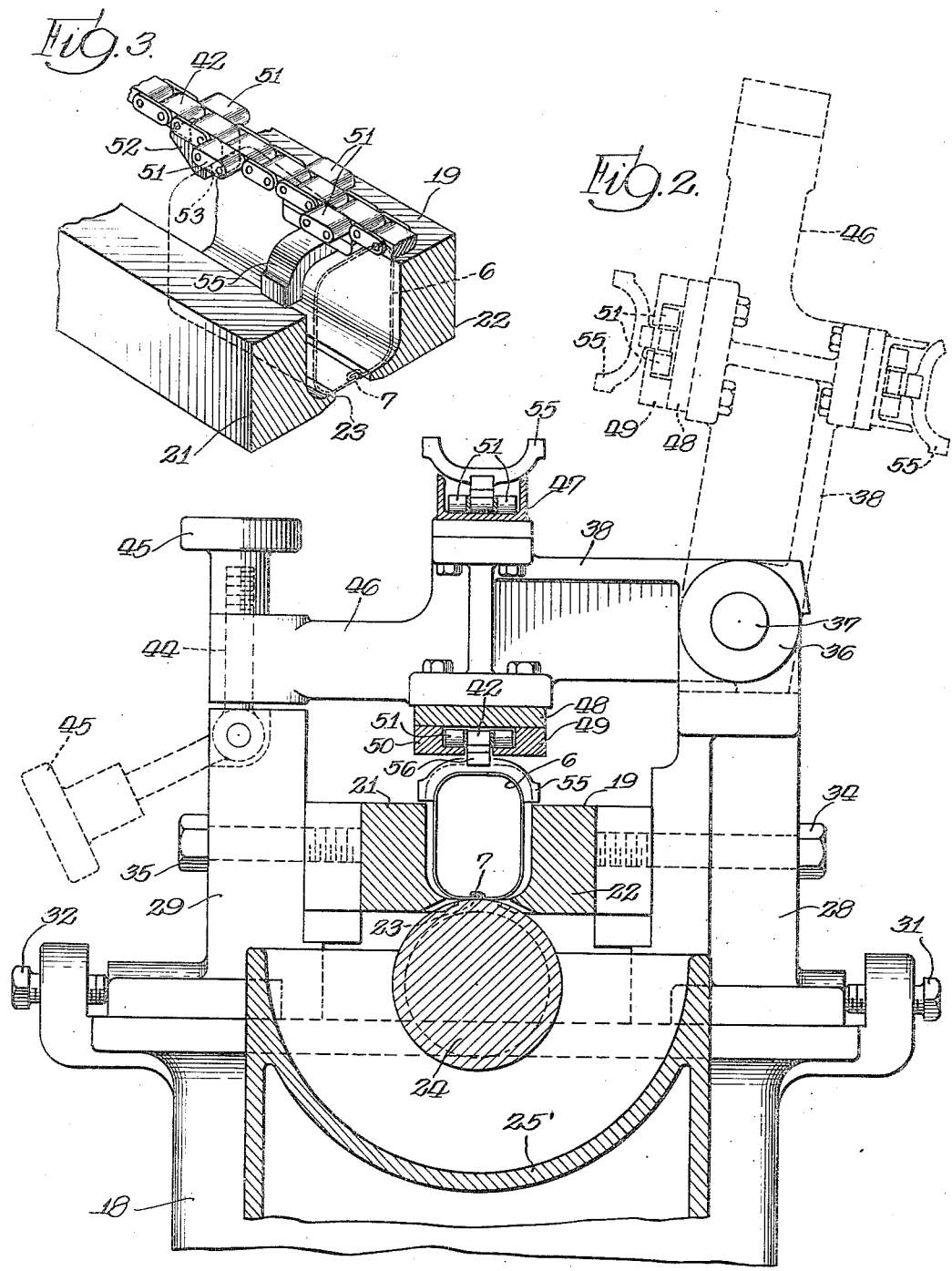

2,179,479

UNITED STATES PATENT OFFICE 2,179,479

SOLDERING ATTACHMENT FOR TAPERED BODIES

Allan M. Cameron, Oak Park, Ill., assignor to Cameron Can Machinery Co., Chicago, Ill., a corporation of Illinois Application October 21, 1937, Serial No. 170,198

11 Claims. (Cl. 113—115)

In the manufacture of can bodies, the body making machine forms the bodies and connects the edges together along a longitudinally extending side seam whereupon the bodies are delivered to an apparatus which solders the previously formed side seam. This soldering apparatus being an accessory to the body maker is commercially known as a side seam soldering attachment.

My present invention relates to a soldering attachment of this general type and pertains more particularly to an attachment for soldering the side seams of tapered can bodies.

Tapered cans are employed for packaging many products including certain meats, and for sanitary purposes such bodies are usually interiorly lacquered. Since the sliding of such bodies along an internal horn would result in scratching and injuring the lacquer lining, soldering attachments designed to operate upon internally lacquered bodies are usually equipped with an external horn which surrounds and engages the exteriors only of the bodies travelling therethrough.

In order to present the side seam to be soldered parallel with and in proximity to the soldering roll, some provision is required for properly positioning and holding the small ends of the bodies as they travel along the horn. Auxiliary abutments carried by chains travelling with the bodies have heretofore been employed for this purpose as well as other expedients for holding the small ends of the bodies against vertical and horizontal movements during the application of solder to the seams, but so far I am aware such expedients have involved structural complications which added considerably to the expense of manufacture, operation and maintenance of the apparatus.

My present invention is concerned with this problem of holding the smaller ends of tapered can bodies so as to present the side seams in proper relation and alignment with the soldering roll and aims to provide a mechanism for this purpose which will infallibly and accurately accomplish the desired results, one which will not involve complications in structure and which can be economically manufactured and will be reliable and durable in use.

For the purpose of facilitating an understanding of my invention, I have illustrated on the accompanying drawings a preferred embodiment thereof from which, when considered in connection with the following description, the principles of my invention and many of its inherent advantages should be readily appreciated.

Referring to the drawings—

Fig. 1 is a side elevation of a soldering attachment equipped with my invention.

Fig. 2 is a fragmentary transverse sectional view taken on the line 2—2 of Fig. 1; and Fig. 3 is a fragmentary perspective view showing the cooperative relation of the horn and the travelling feeding and holding mechanism to a tapered body being operated upon.

Referring to the drawings more in detail, reference character 5 indicates generally the rear end of a body making machine by which the tapered bodies 6 are formed, the longitudinally extending side seams 7 being disposed at the bottom of the horn 8 upon which the bodies are formed.

The various mechanisms of the body maker are driven by a motor and suitable driving means including a driven shaft 9 provided with a gear wheel 11 meshing with a companion gear 12 upon a shaft 13 which carries a bevel gear 14 adapted to drive a companion bevel gear 15 fixed upon the drive shaft 16 of the soldering attachment which is positioned rearwardly of the body maker and in alignment therewith.

The base 17 of the soldering attachment may be of any preferred construction adapted to support a plurality of upright standards 18 by which the external horn 19 is adjustably carried. This horn, as will be apparent from Figs. 2 and 3, comprises two elongated solid bars 21 and 22 of the cross-sectional shape illustrated adapted to receive between them a tapered body as shown and to provide guides for the sides of the large ends of the body so as to prevent lateral movement thereof and to provide a support and guide for the bottom side of the body. These horn members are spaced apart to provide in effect a slot 23 between them through which the soldering roll 24 may apply solder to the side seam 7 as the bodies travel along the roll. It should be observed that the can bodies, travelling longitudinally in a horizontal position, extend somewhat above the tops of the horn members and that the horn therefore does not engage the top side of the bodies as has heretofore been customary but is in effect an open top horn which serves as a guide for the sides and bottom only of the can bodies.

The horizontally disposed solder roll 24 is mounted to rotate upon its axis in a solder bath 25' in which the solder is maintained in molten condition by suitable burner 26' or otherwise. The roll is driven through a chain 25 from the shaft 16 which is equipped with the usual slip clutch 26 to prevent injury to the machine in the event that the machine should be started before the solder has reached a molten condition and is therefore frozen to the roll.

The external horn 19 is disposed in alignment with the internal horn 6 of the body maker to receive the can bodies as they are delivered from the body maker by reciprocatory feed dogs 27 in the usual manner. Proper positioning of the external horn and proper spacing of its members 21 and 22 is provided for by the horizontally adjustable blocks 28 and 29 adjustably supported upon the uprights 18 and the subject to adjustment by means of the adjusting screws 31 and 32. The horn members 21 and 22 are adjustably retained in a position between the blocks 28 and 29 by means of bolts 34 and 35.

Each block 28 is provided at its upper end with a bearing 36 to receive a longitudinally extending shaft 37 which serves both as a pivot about which the chain supporting frame 38 may swing from normal full line position shown in Fig. 2 to open dotted line position there illustrated and also serves to drive, through a pair of beveled gears 39, a driving sprocket wheel 41 over which one end of the chain 42 is trained, the opposite end being trained over an idler sprocket wheel 43 as illustrated in Fig. 1. Threaded pivoted links 44 equipped with clamping hand wheels 45 serve to lock the frame 38 in the normal position shown in Figs. 1 and 2, the arms 46 of the frame being bifurcated to accommodate the swinging movements of the links from inoperative to operative position.

The frame 38 comprises also the longitudinally extending U shaped guide bar 47 by which the upper lap of chain 42 is supported by and guided in its travel and a plate or bar 48 extending longitudinally of the frame to the lower face of which is bolted a pair of L shaped bars 49 and 50 forming in conjunction with the bars 48 an enclosed track or guideway in which the lower lap of chain 42 travels between the sprocket wheels 41 and 43. The chain, as will be apparent from Fig. 3 is provided on each side with spaced guide blocks 51 which carry the weight of the chain so that the lower lap thereof is maintained during its travel in parallelism with the horn 19. At predetermined intervals the chain is equipped with outwardly projecting feed dogs 52 providing a shoulder 53 adapted to engage the rear edge of a can body to feed the same along the horn 19 and with an abutment face 54 against which the rear margin of the upper wall of the larger end of a can body abuts so as to prevent raising of this end as the body travels over the solder roll.

At similar intervals the chain is equipped with outwardly extending U shaped holding members 55 adapted to engage the upper wall of a can body near its smaller end and also the upper portions of the side walls of the body to thereby hold the smaller end of the body against both vertical and lateral displacement. The feed dogs 52 and the supporting shanks 56 of the holding members 55 project from the chain guideway formed by guide bars 49 and 50 through the slot in the form of a slot provided between the spaced apart inner edges of these two guide bars. Since the lower lap of the chain travels in a substantially enclosed track or guideway, it will be apparent that vertical movements of the chain and of the feed dogs and holding members carried thereby are prevented with the result that the feed dogs and the holding members firmly hold the respective larger and smaller ends of the cam bodies in approximate contact with the bottom wall of the open horn in which the can bodies are travelling. Thus, the side seam of the body is maintained in substantial parallelism with the soldering roll and is prevented from both vertical and lateral displacement relatively thereto. The solder is therefore applied by the roll uniformly to all portions of the seam and without liability of variation such as would result from either vertical or lateral movement of the smaller end of a body during its travel along the solder roll.

It should be apparent from the foregoing that I have provided a means for feeding, guiding, and holding tapered can bodies in transit through the soldering apparatus in which the guiding and holding of the smaller end of a tapered body is performed by the feed chain. All additional guiding chains and abutments and other complicated expedients for accomplishing this result are accordingly obviated. The top of the horn is open so that the bodies may be observed during their travel, and the whole feeding and holding mechanism may be readily tilted back to afford access to any or all of the bodies in the horn and to the horn itself should occasion require as the result of a jam or for other reasons.

While I have illustrated and described that embodiment of my invention which at present seems preferable, it should be understood that the structural details here exemplified are capable of considerable modification and variation within the scope of my invention as defined in the following claims.

I claim:

1. An attachment for soldering the side seams of tapered bodies comprising an external open topped horn proportioned to accommodate the larger ends of such bodies, a travelling conveyor disposed above and in alignment with said horn, and means carried by said conveyor adapted to engage the top wall and side walls of a tapered body for holding the smaller end of such body against upward and transverse movements during the travel thereof along said horn.

2. A side seam soldering attachment for tapered can bodies comprising an open topped external horn adapted to receive such bodies, an endless chain having the lower lap thereof disposed above and parallel with said horn, means for driving said chain, can body feeding dogs mounted on said chain, and means carried by said chain shaped to engage the top and side walls of a tapered body disposed in said horn for holding said body so as to maintain the side seam thereof in parallelism with the longitudinal axis of said horn during the travel of said body through said horn.

3. A side seam soldering attachment for tapered can bodies comprising an open topped external horn adapted to receive such bodies, a feed chain having one lap thereof disposed in proximity to said horn, feed dogs carried by said chain, can body holding means carried by said chain, said holding means being shaped to partially surround and embrace tapered bodies to hold the smaller ends of same against upward and transverse movements, and means for actuating said chain whereby the bodies are advanced along said horn and retained in predetermined position therein during such advance.

4. A side seam soldering attachment for tapered can bodies comprising an open topped external horn proportioned to guide the larger ends of such tapered bodies, a conveyor travelling above said horn, means on the conveyor for advancing such bodies along the horn, and holding devices on the conveyor for holding the bodies against upward and transverse movements during such advance.

5. A side seam soldering attachment for tapered can bodies comprising an open topped external horn, a feed chain above said horn, and means carried by said chain for engaging the top and side portions of can bodies projecting above the horn whereby such bodies are advanced along the horn and retained against upward and transverse movements during such advance.

6. A side seam soldering attachment comprising a U shaped open topped external horn, an endless chain having one lap thereof disposed above the horn and in proximity thereto, can body feeding dogs mounted on the chain, can body holding members shaped to engage the top and side walls of a tapered can body disposed in said horn, guiding means for preventing vertical and lateral displacement of the chain, and means for driving said chain.

7. In a side seam soldering attachment for tapered can bodies, the combination of an open topped external horn, a frame, a plurality of sprocket wheels mounted on said frame, an endless chain trained over said sprocket wheels, a guideway in which the lower lap of said chain travels and by which said chain is retained against vertical and lateral movements in parallelism with the longitudinal axis of said horn, can body feeding dogs depending from said chain beneath said guideway, can body holding members depending from said chain beneath said guideway, said members being shaped to engage the side walls and top wall of bodies being fed by said feed dogs and whereby such bodies are held in said horn with the side seams thereof in parallelism with the longitudinal axis of said horn, and means for operating said chain to advance the can bodies along said horn.

8. A can body side seam soldering attachment comprising an open external horn, a pivotally mounted frame provided with a chain guide disposed in parallelism with said horn, a chain extending through said guide and provided with bearing blocks whereby the chain is held against vertical and lateral displacement by said guide, feed dogs mounted on the chain and projecting outside said guide, and U shaped can body holding members carried by the chain and projecting outside said guide in the position to engage three walls of tapered can bodies disposed in said horn for holding said bodies against upward and transverse movements.

9. In a soldering attachment for tapered can bodies, the combination of an open topped external horn, a guideway extending parallel with said horn, a chain extending through said guideway and provided with guide blocks whereby said chain is maintained in said guideway against vertical and lateral displacement, feed dogs carried by the chain, and U shaped can holding members projecting from the chain toward said horn for holding the smaller ends of said tapered bodies in said horn against upward and transverse movements.

10. A soldering attachment for tapered can bodies, comprising an external horn proportioned to guide the large end of a tapered body, said horn being open so as to expose one wall and adjacent portions of two adjoining walls of a body disposed in said horn, feeding mechanism for the advancing bodies along said horn, and a U-shaped means carried by said feeding mechanism in position to engage said exposed wall and adjoining wall portions for preventing upward and transverse movements of the smaller end of said body during the advance of said body by said feeding mechanism.

11. An attachment for soldering the side seams of tapered bodies, comprising an external open horn proportioned to accommodate the larger ends of such bodies, a traveling chain disposed adjacent to and in alignment with said horn, and means carried by said chain adapted to engage three walls of a tapered body for holding the smaller end of said body against vertical and lateral displacement relatively to the longitudinal axis of the horn during the travel thereof along said horn.

ALLAN M. CAMERON.